Oct. 14, 1952     C. S. LEE     2,613,428
INDEXING MECHANISM FOR MACHINE TOOLS

Filed June 29, 1949     4 Sheets-Sheet 1

INVENTOR.
Chite S. Lee.
BY
Harness, Dickey & Pierce
ATTORNEYS.

Oct. 14, 1952            C. S. LEE            2,613,428
INDEXING MECHANISM FOR MACHINE TOOLS
Filed June 29, 1949            4 Sheets-Sheet 2
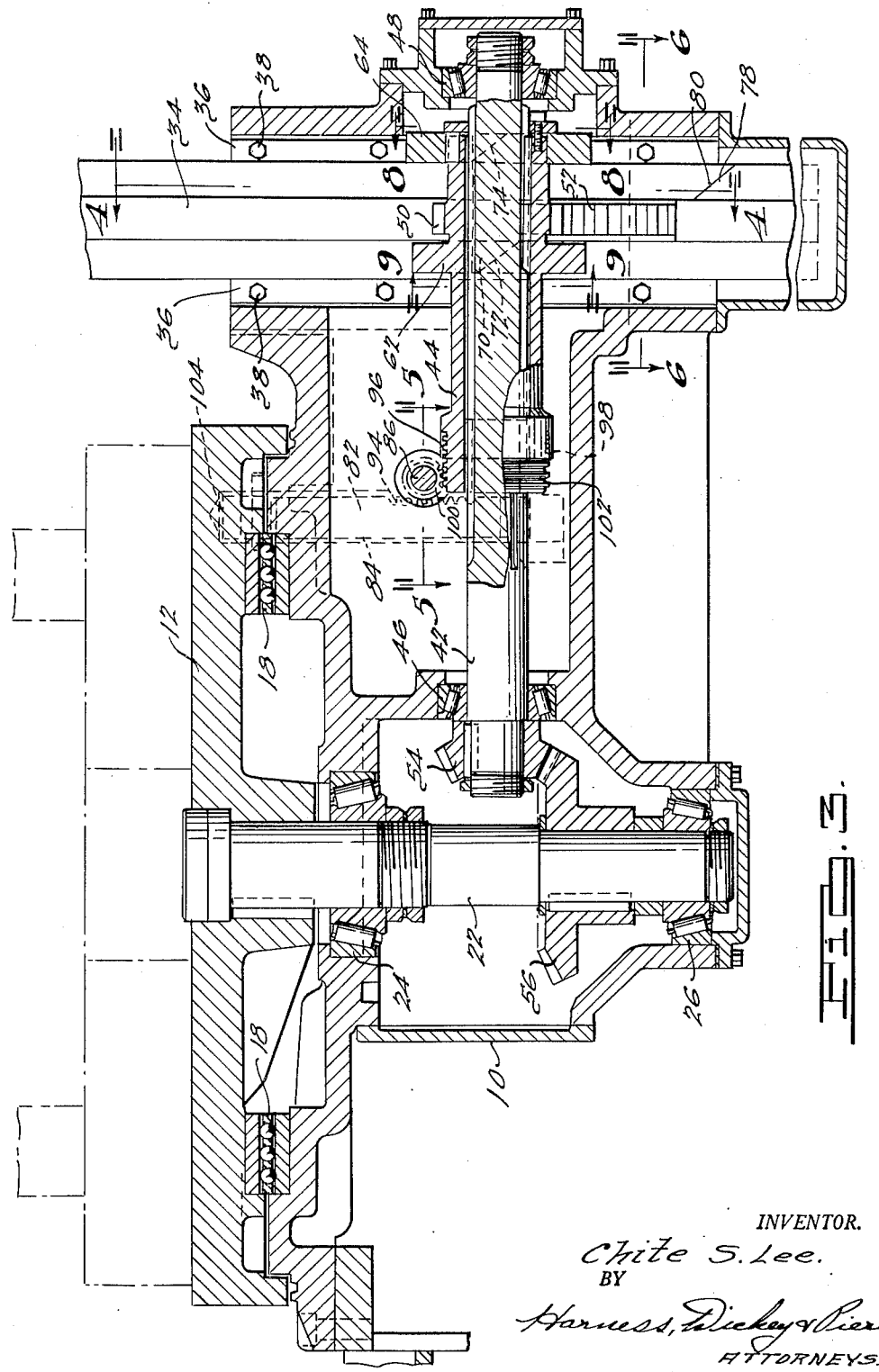
INVENTOR.
Chite S. Lee.
BY
Harness, Dickey & Pierce
ATTORNEYS.

Oct. 14, 1952 C. S. LEE 2,613,428
INDEXING MECHANISM FOR MACHINE TOOLS
Filed June 29, 1949 4 Sheets-Sheet 3
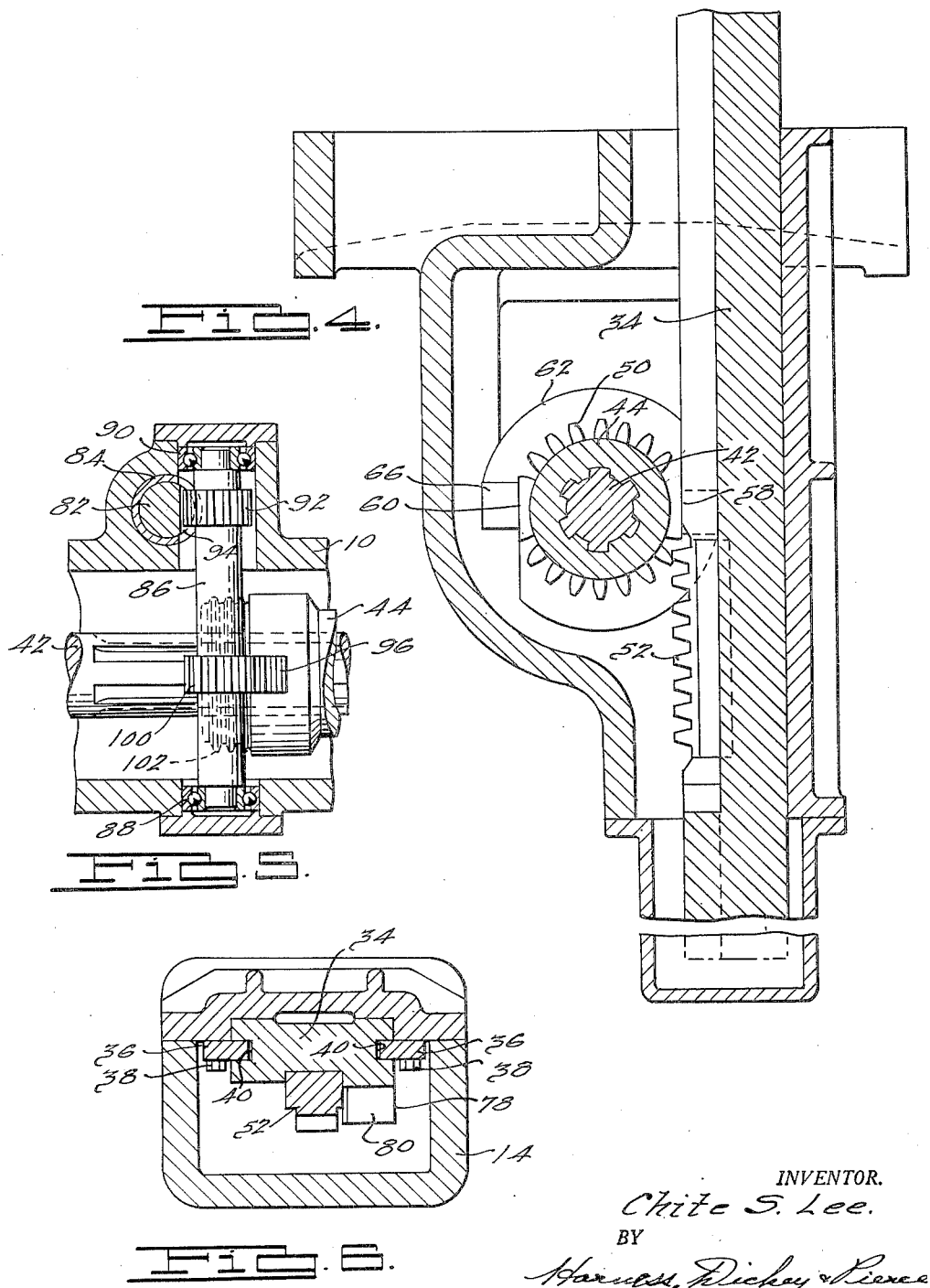
INVENTOR.
Chite S. Lee.
BY
Harness, Dickey & Pierce
ATTORNEYS.

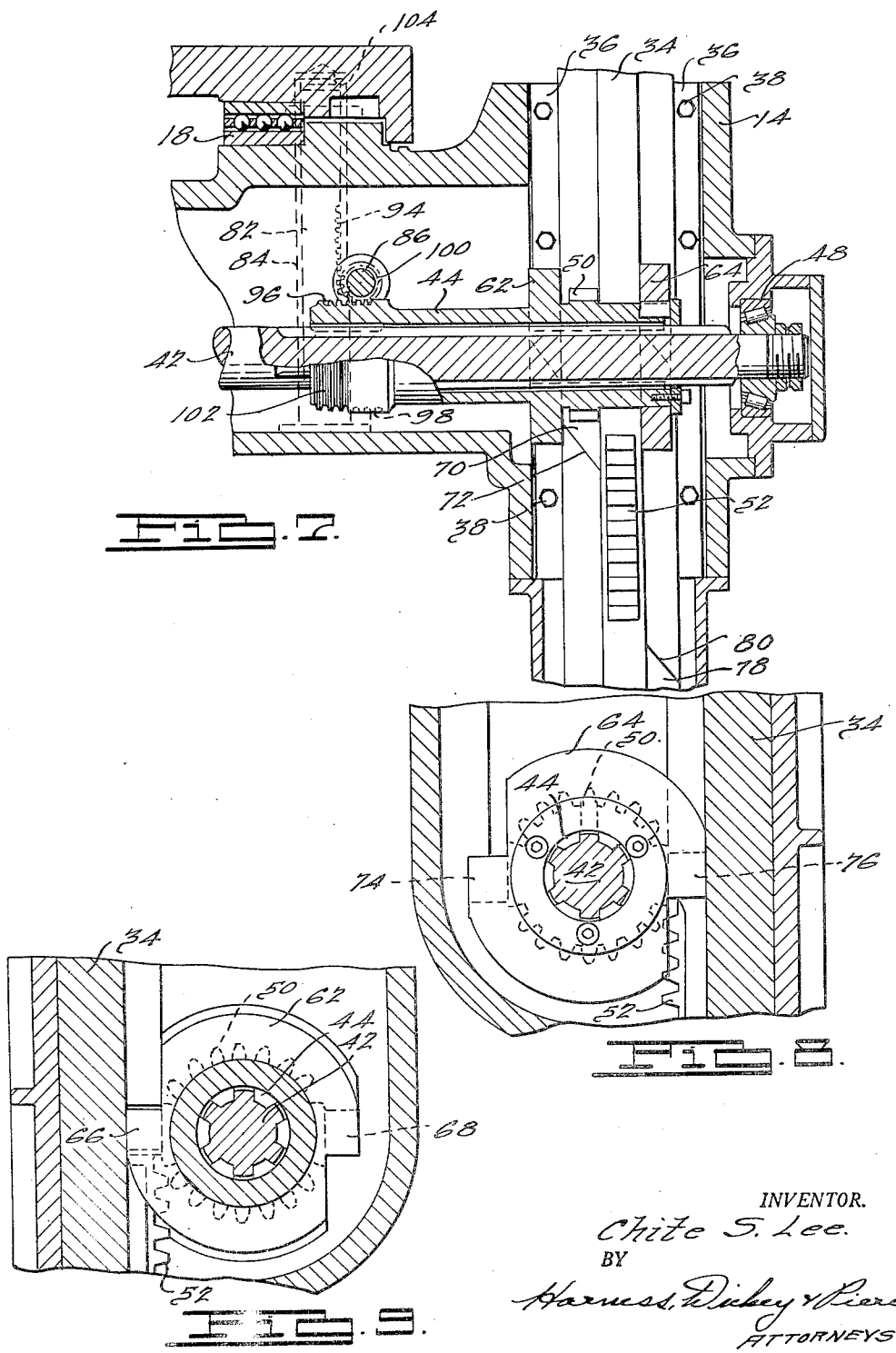

Patented Oct. 14, 1952

2,613,428

UNITED STATES PATENT OFFICE 2,613,428

INDEXING MECHANISM FOR MACHINE TOOLS

Chite S. Lee, Detroit, Mich.

Application June 29, 1949, Serial No. 102,112

10 Claims. (Cl. 29—50)

1

This invention relates to machine tools of the type having a plurality of work stations including means for indexing work progressively from one station to the other and more particularly to means for indexing the table which carries the work and for holding the table securely in each indexed position thereof.

An important object of the present invention is to provide an improved and simplified mechanism for rotatably indexing the worktable of an automatic machine tool.

Another object of the invention is to provide an indexing mechanism of the above-mentioned character which operates in a novel manner to hold the table locked positively in each indexed position thereof.

Still another object of the invention is to provide an indexing mechanism which is highly efficient in operation and at the same time is comparatively inexpensive to manufacture.

Other objects and advantages of the invention will be apparent during the course of the following description.

In the drawings forming a part of this specification and wherein like numerals are employed to designate like parts throughout the same:

Fig. 3 is an enlarged, fragmentary, vertical sectional view taken on the line 3—3 of Fig. 2 showing the locking means disengaged from the worktable;

Fig. 4 is an enlarged, fragmentary, vertical sectional view taken on the line 4—4 of Fig. 3;

Fig. 5 is an enlarged, fragmentary, horizontal sectional view taken on the line 5—5 of Fig. 3;

Fig. 6 is a horizontal sectional view taken on the line 6—6 of Fig. 3;

Fig. 7 is a fragmentary view similar to that of Fig. 3 but showing the indexing mechanism positioned to engage the locking means with the worktable;

Fig. 8 is a fragmentary, vertical sectional view taken on the line 8—8 of Fig. 3; and Fig. 9 is a fragmentary, vertical sectional view taken on the line 9—9 of Fig. 3.

Figures 1, 2:
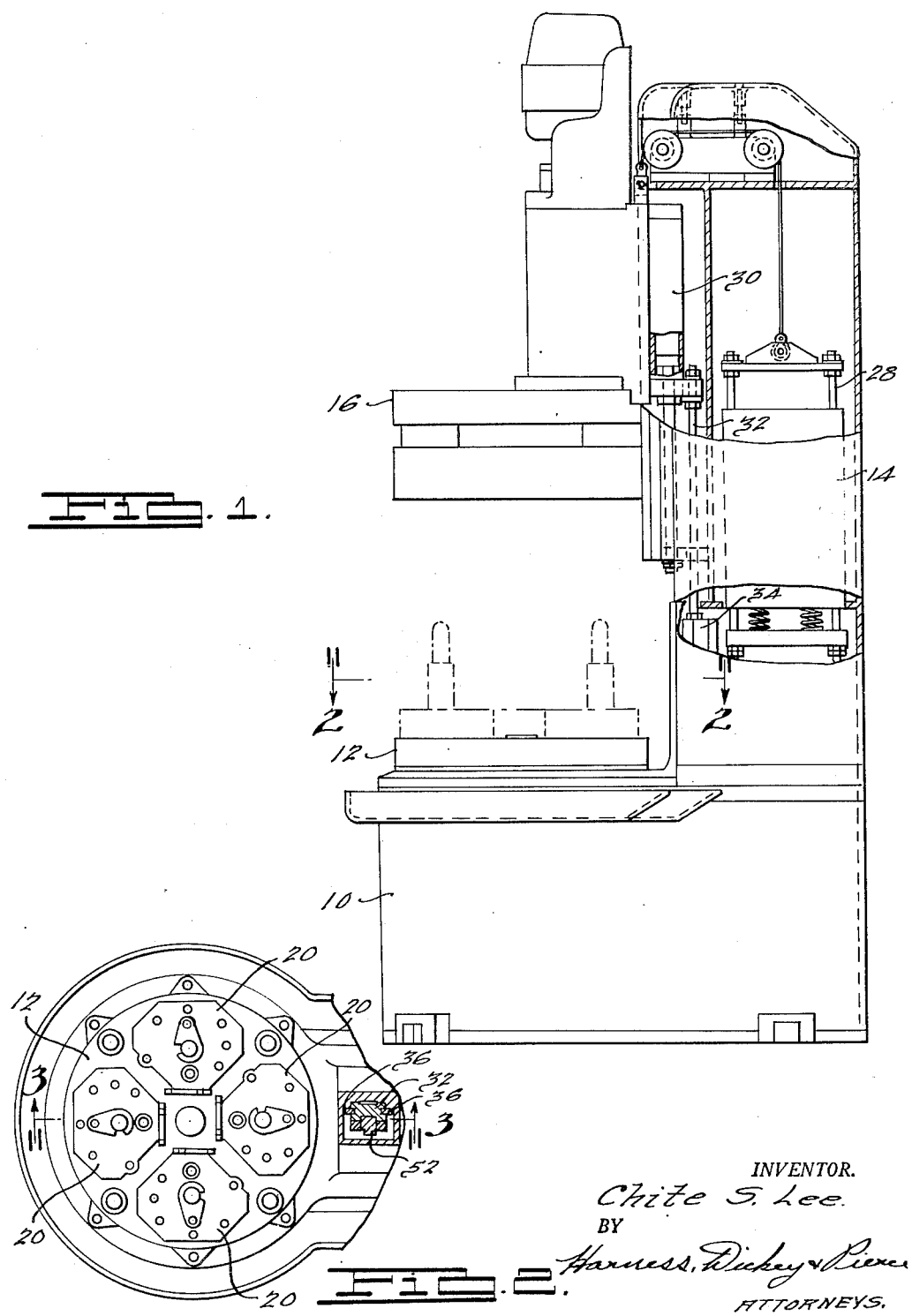
Fig. 1 is a side elevational view, showing parts broken away, of an automatic machine tool embodying the invention.
Fig. 2 is a fragmentary, horizontal, sectional view taken on the line 2—2 of Fig. 1.

The instant invention is shown in the form of a vertical-type machine tool adapted to perform three different operations on a workpiece. A machine of this type has four stations, one for loading and unloading and the other three for performing the various operations on the work.

2

Typical examples of operations performed by a machine of this type are drilling, then countersinking and finally tapping holes in a workpiece. In a machine of this character the workpieces are carried by a worktable and the latter is rotated to move the workpieces progressively under the tools which perform the various machining operations.

As suggested, the present invention is concerned with mechanism for rotating or indexing the worktable so as to move each workpiece progressively from one station to the other. This mechanism indexes the worktable angularly a predetermined amount and positions the work precisely for the machining operations. Also, it must include means for positively holding the worktable after each indexing operation so that the table cannot move inadvertently or as a result of forces resulting from the machining operations.

Although the indexing and locking mechanism embodying the present invention is shown applied to the worktable of a machine tool having four stations, it will be readily appreciated by those skilled in the art that the mechanism is not limited to this application. It can be readily adapted for machine tools having various numbers of work stations and, in fact, can be used to actuate an indexable part of any machine. Such use is contemplated and is within the scope of the invention. It is intended that the mechanism be used in any capacity where such mechanism has utility, and it should be understood that the mechanism has a larger utility than the specific embodiment here shown and described.

The automatic machine tool here shown by way of illustration has a base 10 which supports a worktable 12 and a hollow, vertical column 14 at the rear of the base which supports the tool head 16. The worktable 12 here shown is rotatably supported by an annular series of bearings 18 and is equipped with four equispaced fastening devices 20 of conventional construction for holding workpieces solidly thereon. Keyed centrally to the table 12 is a spindle 22 which depends therefrom and is supported for rotation by spaced bearings 24 and 26. In the particular machine here shown by way of illustration, the head 16 is vertically adjustable and is equipped with the usual counterweight 28 which conveniently may be contained within the hollow column 14. Any suitable or conventional mechanism may be employed for operating the machine; however, I prefer to use a hydraulic unit of the type shown in my Patent No. 2,559,125, granted July 3, 1951. This mechanism is hydraulically operated and electrically controlled and includes a fluid motor 30 having a connecting rod 32 which conveniently can be used to operate the indexing mechanism embodying the present invention.

The mechanism for rotatably indexing the worktable 12 comprises a slide 34 which is fastened to the connecting rod 32 and acts through associated shafts and gearing to rotate the table. More particularly the slide 34 is disposed vertically within the column 14 between spaced guides 36 which are fastened to the column by screws 38 or the like. The guides 36 fit snugly but slidably in guideways 40 provided in the slide 34 so as to hold the same for limited vertical travel in the column 14. Adjacent to the slide 34 are inner and outer splined shafts 42 and 44 (Fig. 3). The splines which connect shafts 42 and 44 positively unite the same for mutual rotation but permit independent sliding movement of the outer shaft. In this connection it will be observed that the inner shaft 42 extends entirely through the outer shaft 44 and the projecting terminal portions thereof are supported for rotation by bearings 46 and 48. A pinion 50 formed integrally on the outer shaft 44 is adapted to mesh with a rack 52 carried by slide 34, and a beveled gear 54 keyed on the inner shaft 42 meshes with a beveled gear 56 keyed on the spindle 22.

In use, the slide 45 is reciprocated once; i. e., is moved downwardly and then upwardly, by the fluid motor 30 of the hydraulic unit for each indexing operation of the table 12. As suggested, the slide 34 is in raised position at the beginning of the indexing cycle and the rack 52 is disposed above the pinion 50. As the slide moves downwardly at the beginning of the indexing cycle, rack 52 engages the pinion 50 and rotates the same a half revolution of one hundred and eighty degrees. Manifestly, rotation of pinion 50 in this manner also imparts the same angular movement to shafts 42 and 44 and to the beveled gear 54. In the form of the invention here shown by way of illustration, a 1:2 ratio exists between beveled gears 54 and 56 so that rotation of gear 54 through one hundred and eighty degrees rotates gear 56 and consequently table 12 ninety degrees. In a four-station machine of the type shown, a ninety-degree rotation of the table 12 advances all of the workpieces one station. After the table has been indexed, slide 34 coacts with pinion 50 in a manner hereinafter described in detail to lock the rotary drive mechanism and consequently the table 12 in the indexed position. Thereafter, cam means associated with the slide 34 and the outer shaft 44 operate to slide the shaft axially so as to move the pinion 50 out of alignment with the rack 52. In the form of the invention here shown, axial movement of the shaft 44 also is utilized to operate a locking mechanism which coacts directly with the table to hold the latter solidly in the indexed position. Slide 34 is then retracted and since the pinion 50 has been moved out of alignment with the rack 52, the latter returns to its initial raised position without engaging the pinion and without actuating the indexing mechanism. Just before the slide 34 is fully raised and after the rack 52 has moved to a position above the pinion 50, a second cam means associated with the slide and the outer shaft 44 operates to retract the shaft so as to again bring the pinion 50 into alignment with the rack 52 preparatory to the next indexing operation. As the shaft 44 retracts, the locking mechanism is disengaged from the table 12 so that the latter will be free to rotate during the next indexing cycle.

With respect to the means for locking the indexing mechanism after the table 12 has been rotated exactly ninety degrees, attention is directed to Fig. 4 wherein it is shown that the pinion 50 is formed with flats 58 and 60 at diametrically opposite sides thereof. These flats 58 and 60 are adapted to engage flatly against the slide 34, as shown in the drawings, after the rack 52 disengages the pinion 50. From the foregoing it will be readily apparent that each flat engages the slide 34 on alternate indexing cycles. In other words, the flat 58 will engage slide 34, as shown in the drawings, on one indexing cycle. On the next indexing cycle the pinion 50 will be rotated one hundred eighty degrees and the flat 60 will engage slide 34. The flat 60 will remain in this position until the subsequent indexing cycle when the pinion 50 is again rotated one hundred and eighty degrees to bring the flat 58 into conforming relation with the slide 34.

Manifestly, the pinion 50 is locked against rotation as long as the slide 34 is in engagement with either of the flats 58 or 60. Locking of the pinion 50 in this manner will also lock the table 12 and all the mechanism which connects the pinion to the table. The pinion 50 remains locked during the interval following disengagement of the pinion by the rack 52 and preceding axial movement of the shaft 44 by the cam means hereinabove referred to. When the shaft 44 advances in the manner described, the pinion 50 moves out of alignment with rack 52 and the flats 58 and 60 are moved to one side of the slide 34. Thus, axial movement of the shaft 44 not only moves pinion 50 out of alignment with rack 52 but it also disengages flat 58 or 60 from slide 34.

The cam means for sliding shaft 44 back and forth on shaft 42 are perhaps best illustrated in Figs. 3, 8 and 9. It will be observed, in this connection, that the shaft 44 is provided with a pair of radial flanges 62 and 64, which flanges are disposed on opposite sides of and spaced from the pinion 50. The flange 62 is provided at diametrically opposed sides thereof with beveled cam surfaces 66 and 68, and the slide 34 carries a cam block 70 having a beveled cam surface 72 which is engageable with either one or the other of cam surfaces 66 and 68 when the shaft 44 is retracted as shown in Fig. 3. As suggested, the cam surface 72 engages one or the other of cams 66 and 68 just before the slide 34 reaches the lower limits of travel so that the last increment of motion of the slide is utilized to advance shaft 44 axially from the position shown in Fig. 3 to the position shown in Fig. 7. Similarly the flange 64 is provided at diametrically opposite sides thereof with beveled cam surfaces 74 and 76 which are adapted to engage a cam block 78 carried by slide 34. As perhaps best shown in Fig. 3, the cam block 78 is formed with a beveled cam surface 80 which is engageable with one or the other of cam surfaces 74 and 76 when the shaft 44 is in the advanced position (Fig. 7). As perhaps best shown in Fig. 3, the cam block 78 is disposed below the rack 52 so that the cam surface 80 engages one or the other of the cam surfaces 74 and 76 just prior to the time slide 34 reaches the upper limit of its travel. Thus, the last increment of travel of the slide 34 as it completes its upstroke is utilized to retract shaft 44 to its initial position.

The means for positively locking the table 12 in its indexed position shown in Figs. 3, 5, and 7 comprises a locking pin 82 mounted for vertical sliding movement in a sleeve bushing 84 disposed in the base 10 below the table laterally of but adjacent to the shaft 42. A shaft 86 arranged transversely of and above the shaft 42 and mounted for rotation in suitable bearings 88 and 90 carries a pinion 92 which meshes with a rack 94 on locking pin 82. In order to drive shaft 86, I provide shaft 44 with a pair of diametrically opposed, longitudinal racks 96 and 98 which alternately engage a pinion 100 on and fixed to shaft 86. One or the other of racks 96 and 98 is always in engagement with the pinion 100, and the outer terminal portions of the racks are connected by teeth 102 which extend entirely around shaft 44 to permit rotation of the shaft during indexing of the table 12. In this connection it will be observed that the racks 96 and 98 are correlated angularly with the flats 58 and 60 so that the latter position the racks properly for engagement with the pinions 100 when engaged with the slide 34 as shown in Fig. 4.

When the shaft 44 is retracted as shown in Fig. 3, the locking pin 82 is lowered so as to be out of engagement with the table 12. As the shaft 44 is rotated one hundred and eighty degrees by downward movement of slide 34 in the manner hereinabove described, the teeth 102 merely slide idly through the teeth of pinion 100. However, as soon as the cam block 70 engages one or the other of cam surfaces 66 and 68 to advance shaft 44, the rack 96 or 98 which is in engagement with the pinion 100 rotates shaft 88 to raise the locking pin 82 into a socket 104 provided in the table. Four equispaced sockets 104 are provided in the undersurface of table 12 to receive locking pin 82, and one or the other of the sockets registers precisely with the locking pin in each indexed position of the table. The pin preferably fits the sockets relatively snugly so that it positions the table exactly for the machining operation and also holds the table solidly in the indexed position. When the shaft 44 is retracted by cam block 72, the locking pin 82 is lowered in an obvious manner to disengage the table preparatory to the next indexing operation.

Where relatively simple machining operations are to be performed on the work the slide 34 operates almost continuously. At the time the slide 34 starts down, the worktable 12 is released and the parts are positioned substantially as shown in Fig. 3. Almost immediately, the rack 52 engages the pinion 50 to index the table, and as soon as the indexing operation is completed one of the flats on the pinion 50 engages the slide 34 to lock the table 12 in the indexed position until such time as the cam block 72 operates to advance shaft 44 and positively lock the table 12 through the medium of locking pin 82. As soon as the indexing operation is completed a finished workpiece is removed from the open station of the machine and a part to be machined is clamped thereon. Also, almost immediately after the indexing operation the tool head 16 is lowered to perform the necessary machining operations on the workpieces.

In practice, the locking pin 82 engages the table 12 before the flats on pinion 50 release the slide 34 so that the table is never released when work is being performed on the workpieces. As soon as the slide 34 reaches the end of its down stroke its direction of travel is reversed by suitable control device (not shown). Thus the slide begins to rise almost immediately and, as hereinabove described, it returns to its initial position without performing any useful function except to retract shaft 44 and disengage locking pin 82 from the worktable 12. By this time all of the machining operations have been completed, a finished workpiece has been removed from the table and a new workpiece placed thereon so that the machine is ready for the next cycle of operation.

It may thus be seen that I have achieved the objects of my invention. I have provided a mechanically operated indexing mechanism for machine tools which is simple yet highly efficient in operation. The entire operation is fully automatic and all the working parts are so combined and correlated that positive indexing and positioning of the worktable 12 is assured.

Having thus described the invention, I claim:

1. A machine tool having a rotatable work-supporting table, means for rotatably indexing said table including a rotatable inner driven shaft, and an outer drive shaft mounted for mutual rotation with and slidable on said driven shaft; a reciprocatory actuator coactive with said drive shaft to rotatably drive the same during reciprocatory movement thereof and to slidably actuate said drive shaft at the ends of said reciprocatory movement; a slidable locking pin for holding said worktable against rotation; means for transferring motion from said drive shaft to said locking pin to move said locking pin into and out of engagement with said table, said means including a rack on the locking pin, a first pinion coactive with said rack, a second pinion mounted for mutual rotation with said first pinion, and a rack on the drive shaft engageable with said second pinion, said rack having a plurality of annular teeth engageable with said second pinion during rotary movement of said drive shaft.

2. In a machine tool having a rotatable work-supporting table, means for rotatably indexing said table including a rotatable inner driven shaft and an outer drive shaft mounted for mutual rotation with and slidable on said driven shaft; a slidable actuator having a rack thereon; a pinion on said drive shaft coactive with said rack to rotate the drive shaft; and means on said actuator coactive with said drive shaft to move the same axially when the actuator is at one end of its reciprocatory travel whereby to move said pinion out of engagement with said rack.

3. In a machine tool having a rotatable work-supporting table, means for rotatably indexing said table including a rotatable inner driven shaft and an outer drive shaft mounted for mutual rotation with and slidable on said driven shaft; a slidable actuator having a rack thereon; a pinion on said drive shaft coactive with said rack to rotate the drive shaft; means on said actuator coactive with said drive shaft to move the same axially when the actuator is at one end of its reciprocatory travel whereby to move said pinion out of engagement with said rack; and means carried by said actuator coactive with said drive shaft when the actuator is at the other end of its reciprocatory travel to move said drive shaft axially whereby to again position said pinion for engagement with said rack.

4. In a machine tool having a rotatable work-supporting table, means for rotatably indexing said table including a rotatable inner driven shaft and an outer drive shaft mounted for mutual rotation with and slidable on said driven shaft; a reciprocable actuator; selectively engageable rotary drive means interconnecting said actuator and said drive shaft; means operable by said actuator for disengaging said rotary drive means when said actuator is at one end of its travel; and means operable by said actuator for selectively engaging said rotary drive means when the actuator is at the other end of its reciprocatory travel.

5. In a machine tool having a rotatable work-supporting table, means for rotatably indexing said table including a rotatable inner driven shaft and an outer drive shaft mounted for mutual rotation with and slidable on said driven shaft; a slidable actuator having a rack thereon; a pinion on said drive shaft selectively engageable with said rack to translate reciprocatory movement of the actuator into rotary movement of the drive shaft; cam means on said actuator and said drive shaft engageable when the actuator is in one reciprocatory position to slidably actuate said drive shaft so as to position said pinion for engagement with said rack; and cam means carried by said actuator and said drive shaft engageable when the actuator is in another reciprocatory position to slidably actuate said drive shaft so as to position said pinion out of engagement with said rack.

6. In a machine tool having a rotatable work-supporting table, means for rotatably indexing said table including a rotatable inner driven shaft and an outer drive shaft mounted for mutual rotation with and slidable on said driven shaft; a slidable actuator having a rack thereon; a pinion on said drive shaft selectively engageable with said rack to translate reciprocatory movement of the actuator into rotary movement of the drive shaft; cam means on said actuator and said drive shaft engageable when the actuator is in one reciprocatory position to slidably actuate said drive shaft so as to position said pinion for engagement with said rack; cam means carried by said actuator and said drive shaft engageable when the actuator is in another reciprocatory position to slidably actuate said drive shaft so as to position said pinion out of engagement with said rack; and means operable by reciprocatory travel of said drive shaft for locking said table against rotation.

7. In a machine tool having a rotatable work-supporting table, means for rotatably indexing said table including a rotatable inner driven shaft and an outer drive shaft mounted for mutual rotation with and slidable on said driven shaft; a reciprocatory actuator having a rack and a flat surface adjacent said rack; an arcuate toothed segment on said drive shaft engageable with said rack; and a flat surface adjacent said arcuate toothed segment engageable with the flat surface of said actuator to lock said table against rotation.

8. In a machine tool having a rotatable work-supporting table, means for rotatably indexing said table comprising a rotatable inner driven shaft and an outer drive shaft mounted for mutual rotation with and slidable on said driven shaft; means including a rack and pinion for rotating said drive shaft through a predetermined angular movement; and coactive surfaces on said rack and said pinion engageable to hold said table against rotation after said predetermined angular movement.

9. In a machine tool having a rotatable work-supporting table, means for rotatably indexing said table comprising a rotatable inner driven shaft and an outer drive shaft mounted for mutual rotation with and slidable on said driven shaft; means including a rack and pinion for rotating said drive shaft through a predetermined angular movement; coactive surfaces on said rack and said pinion for holding said table against rotation after said predetermined angular movement; and coactive cam means for slidably actuating said drive shaft to move the pinion into and out of engagement with said rack.

10. In a machine tool having a rotatable work-supporting table, means for rotatably indexing said table comprising a rotatable inner driven shaft and an outer drive shaft mounted for mutual rotation with and slidable on said driven shaft; means including a rack and pinion for rotating said drive shaft through a predetermined angular movement; coactive surfaces on said rack and said pinion for holding said table against rotation after said predetermined angular movement; coactive cam means associated with said rotating means and said drive shaft for slidably actuating said drive shaft axially to move the pinion into and out of engagement with said rack; and means actuated by axial sliding movement of said drive shaft to lock said table positively in each indexed position thereof.

CHITE S. LEE.

REFERENCES CITED

The following references are of record in the file of this patent:

UNITED STATES PATENTS

| Number | Name | Date |
|---|---|---|
| 874,035 | Prentice | Dec. 17, 1907 |
| 1,651,949 | Daniels | Dec. 6, 1927 |
| 1,703,986 | Brown | Mar. 5, 1929 |
| 2,329,756 | Granberg et al. | Sept. 21, 1943 |